(12) United States Patent
Tsutsumi et al.

(10) Patent No.: US 9,340,234 B2
(45) Date of Patent: May 17, 2016

(54) VEHICLE BODY SIDE STRUCTURE

(71) Applicant: Nissan Motor Co., Ltd., Kanagawa (JP)

(72) Inventors: Masahiro Tsutsumi, Kanagawa (JP); Takashi Mukaiyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/371,033

(22) PCT Filed: Dec. 28, 2012

(86) PCT No.: PCT/JP2012/084053
§ 371 (c)(1),
(2) Date: Jul. 8, 2014

(87) PCT Pub. No.: WO2013/105462
PCT Pub. Date: Jul. 18, 2013

(65) Prior Publication Data
US 2015/0001881 A1  Jan. 1, 2015

(30) Foreign Application Priority Data

Jan. 12, 2012  (JP) ................. 2012-003744

(51) Int. Cl.
*B62D 25/04* (2006.01)
*B62D 25/02* (2006.01)
*B60J 5/06* (2006.01)

(52) U.S. Cl.
CPC . B62D 25/04 (2013.01); B60J 5/06 (2013.01); B62D 25/02 (2013.01)

(58) Field of Classification Search
CPC ........ B62D 25/04; B62D 25/06; B62D 27/02; B60J 5/06; B60J 5/00; B60J 5/042; B60J 5/047; B60J 10/0031; B60J 10/02; B60J 10/085; B60J 5/0425; B60J 5/043; B60J 5/0433; B60J 5/0443; B60J 5/0458; B60J 5/0461; B60J 5/0463; B60J 5/0477; B60J 5/0479
USPC ........... 296/203.03, 146.6, 202, 146.9, 146.1, 296/155, 187.05, 193.05, 193.06; 292/100, 292/196, 199, 226, 137, 156, 195, 219, 281, 292/221
See application file for complete search history.

(56) References Cited

U.S. PATENT DOCUMENTS 3,757,064 A * 9/1973 Ogawa .................... B60R 22/06
                                                          200/61.64
4,466,645 A * 8/1984 Kobayashi ............ E05B 85/045
                                                          292/216
(Continued)

FOREIGN PATENT DOCUMENTS

EP        0103734 A1   3/1984
JP        59-26071 U   2/1984
(Continued)

OTHER PUBLICATIONS

International Search Report for corresponding International Application No. PCT/JP2012/084053, mailed Mar. 5, 2013 (2 pages).
(Continued)

*Primary Examiner* — Glenn Dayoan
*Assistant Examiner* — Sunsurraye Westbrook
(74) *Attorney, Agent, or Firm* — Osha Liang LLP

(57) ABSTRACT

A side structure of a vehicle body has a side panel provided in a side part of the vehicle body, a door striker which is provided on a vehicle body outer side of the side panel and is engageable with a latch of a sliding door, a sliding door rail which is provided on the vehicle body outer side of the side panel and slidably supports the sliding door, and a joint bracket provided on a vehicle body inner side of the side panel. The joint bracket is connected to the door striker and the sliding door rail.

5 Claims, 5 Drawing Sheets

(56) References Cited

U.S. PATENT DOCUMENTS

| | | | |
|---|---|---|---|
| 5,117,665 A | 6/1992 | Swan et al. | |
| 6,382,705 B1* | 5/2002 | Lang | B60J 5/0479 296/146.12 |
| 6,698,080 B2* | 3/2004 | Sawajiri | E05B 85/045 29/509 |
| 7,000,976 B2* | 2/2006 | Azzouz | B60J 5/0479 296/146.1 |
| 8,186,743 B2* | 5/2012 | Anderson | B60J 5/042 296/146.6 |
| 8,303,028 B2* | 11/2012 | Domlovil | B62D 25/02 296/155 |
| 2010/0058666 A1* | 3/2010 | Kim | B60J 5/0487 49/28 |
| 2010/0283271 A1* | 11/2010 | Hemingway | E05B 85/045 292/341.15 |
| 2010/0327630 A1* | 12/2010 | Klimek | B62D 25/04 296/203.03 |
| 2011/0101733 A1 | 5/2011 | Anderson et al. | |
| 2011/0316294 A1* | 12/2011 | Kim | B62D 25/04 292/340 |
| 2012/0319431 A1* | 12/2012 | Bodin | B62D 29/007 296/203.03 |

FOREIGN PATENT DOCUMENTS

| | | |
|---|---|---|
| JP | 64-32281 U | 2/1989 |
| JP | 5-6174 Y2 | 2/1993 |
| JP | 8-332975 A | 12/1996 |
| JP | 3622266 B2 | 2/2005 |

OTHER PUBLICATIONS

Written Opinion for corresponding International Application No. PCT/JP2012/084053, mailed Mar. 5, 2013 (3 pages).

Extended Search Report issued in corresponding European Application No. 12864963.9, mailed Mar. 10, 2015 (5 pages).

* cited by examiner

VEHICLE BODY SIDE STRUCTURE

BACKGROUND

1. Technical Field

The present invention relates to a side structure of a vehicle body.

2. Related Art

In publicly-known structures for a side surface of vehicle body, a door striker is provided for the sidewall of the vehicle body (see Patent Literature 1, for example). In Patent Literature 1, a door striker is provided on the vehicle body outer side of an outer panel, which constitutes the sidewall of a vehicle body. Moreover, a reinforcement member is provided on the vehicle body inner side of the outer panel, and the door striker is fastened together to the reinforcement member with the outer panel interposed therebetween.

CITATION LIST

Patent Literature

Patent Literature 1: Japanese Utility Model Application Publication No. H01-32281

SUMMARY OF INVENTION

However, in the aforementioned conventional side structure of the vehicle, when a load is applied to a sliding door from the vehicle body inner side, the sliding door could deform to disengage the latch and door striker which are engaged with each other. Accordingly, there has been a demand for an increase in mounting strength of the door striker.

Accordingly, in the light of the aforementioned problem, an object of the present invention is to provide a side structure of a vehicle body which is capable of effectively preventing the engaged latch and door striker from being disengaged when a load is applied to the sliding door from the vehicle body inner side.

A side structure of a vehicle body according to the present invention includes: a side panel provided in a side part of the vehicle body; a door striker which is provided on a vehicle body outer side of the side panel and is engageable with a latch of a sliding door; a sliding door rail which is provided on the vehicle body outer side of the side panel and slidably supports the sliding door; and a joint bracket provided on a vehicle body inner side of the side panel. The joint bracket is connected to the door striker and the sliding door rail.

DETAILED DESCRIPTION

Hereinafter, a description is given of embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
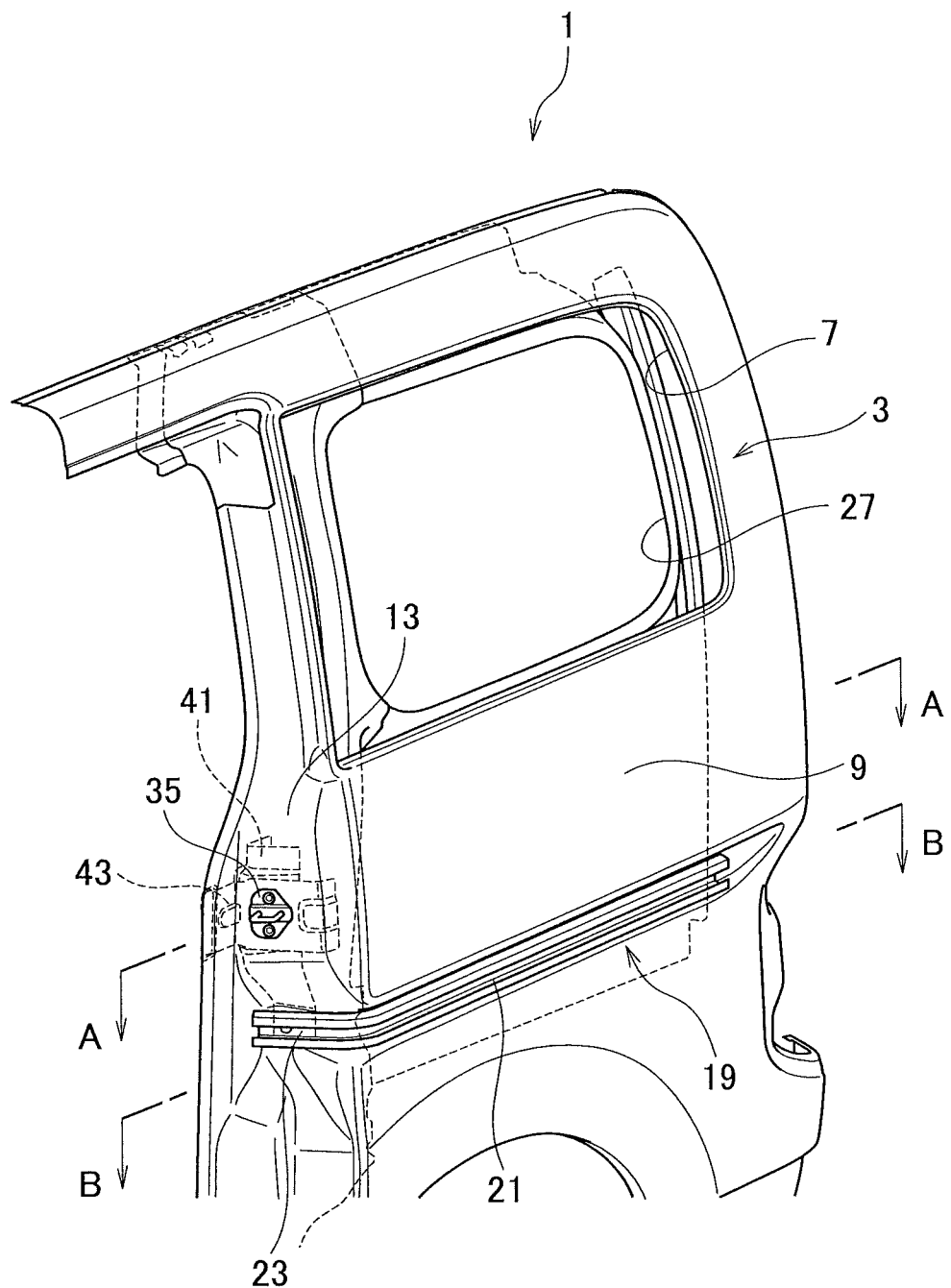
FIG. 1 is a perspective view illustrating a rear part of a vehicle body side, showing a vehicle-body side structure according to an embodiment of the present invention.
Figure 2:
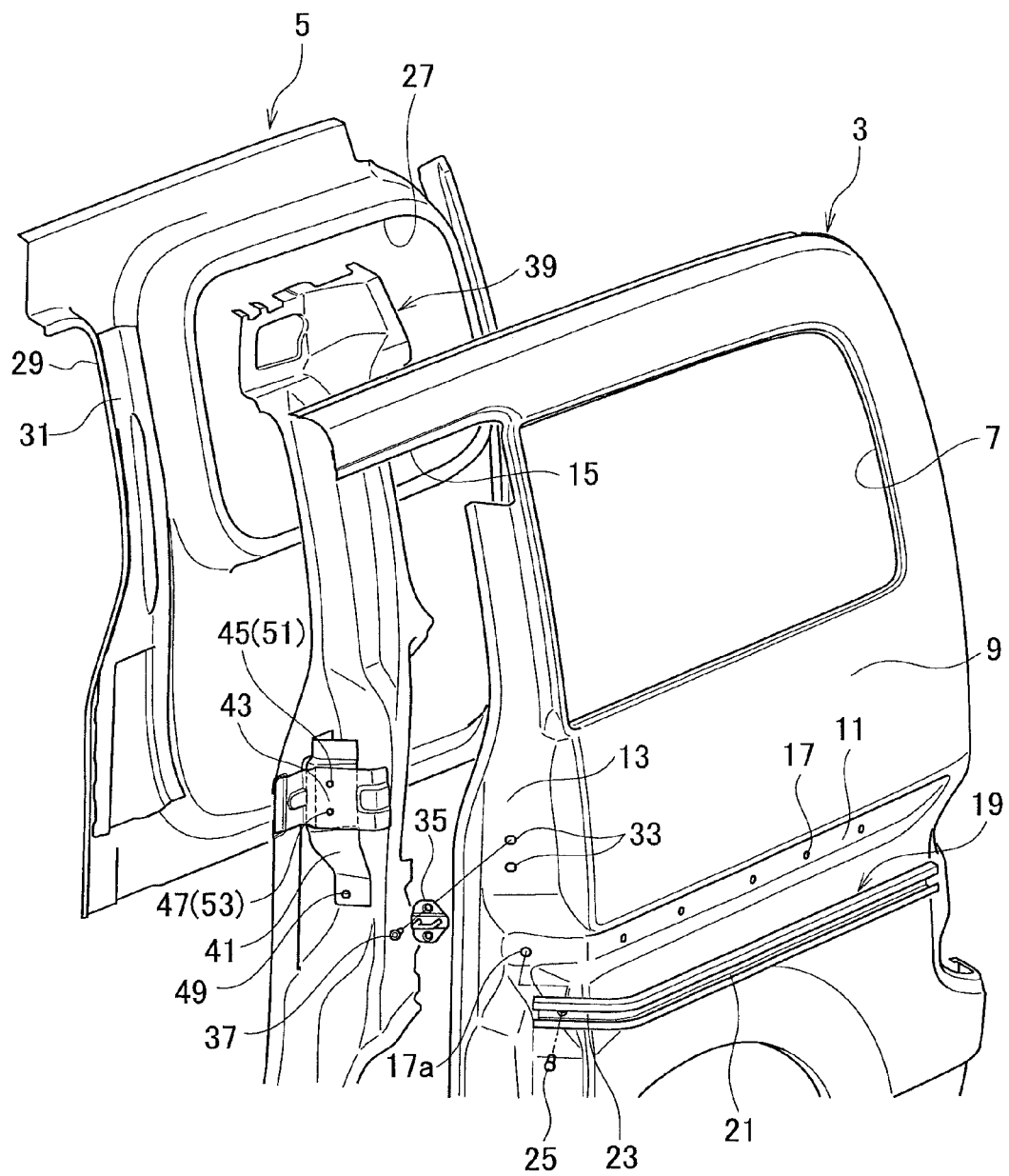
FIG. 2 is an exploded perspective view of FIG. 1.
Figure 3:
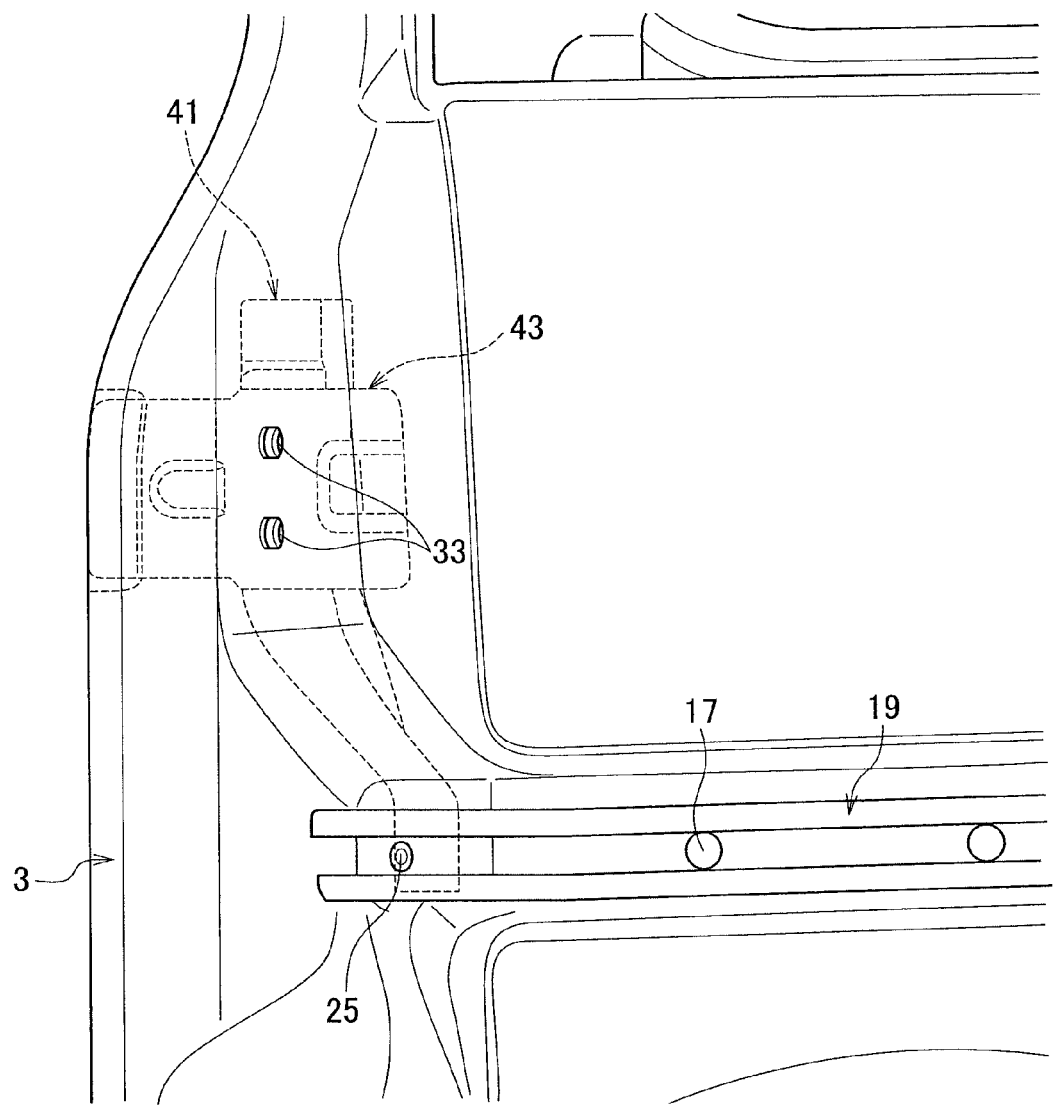
FIG. 3 is an enlarged side view of a main part of FIG. 1.

As illustrated in FIGS. 1 to 3, a body side rear portion 1 according to the embodiment is schematically composed of a body side outer 3 (a side panel) on the vehicle body outer side and a body side inner 5 on the vehicle body inner side, which are assembled to each other.

In upper rear part of the body side outer 3, a door glass opening 7 is formed, which is rectangular in a front view. Under the door glass opening 7, a general face 9 is formed. In lower part of the general face 9, a sliding door rail attachment 11 is formed. The sliding door rail attachment 11 extends in the vehicle's longitudinal direction. Front part of the general face 9 and front part of the sliding door rail attachment 11 are bent to the vehicle body inner side to form a bent surface 13 extending in the oblique direction. In front of the door glass opening 7, a sliding door opening 15 is formed.

The sliding door rail attachment 11 includes plural bolt holes 17 formed at predetermined intervals along the vehicle's longitudinal direction. A bolt hole 17a at the front end is formed in the bent face 13. A sliding door rail 19 is integrally composed of a straight portion 21 and a bent portion 23. The straight portion 21 extends in a linear fashion along the vehicle's longitudinal direction in a top view. The bent portion 23 is provided in front of the straight portion 21 and is extended toward the vehicle body inner side. The sliding door rail 19 is formed along the surface profile of the sliding door rail attachment 11. The sliding door rail 19 includes bolt holes at the positions corresponding to the respective bolt holes 17 of the sliding door rail attachment 11. The sliding door rail 19 is fastened to the sliding door rail attachment 11 with bolts 25. The sliding door rail 19 slidably supports a not-shown sliding door.

In upper rear part of the body side inner 5, a door glass opening 27 is formed. The door glass opening 27 is rectangular in a front view. The door glass opening 27 is formed at the position corresponding to the door glass opening 7 of the body side outer 3. In front of the door glass opening 27, a sliding door opening 29 is formed. Between the rear edge of the sliding door opening 29 and the door glass opening 27, a vertically-long reinforcement panel 31 is extended in the vehicle's vertical direction.

Furthermore, in the bent face 13 of the body side outer 3, a pair of upper and lower bolt holes 33, 33 are formed. A door striker 35 is fastened to the bolt holes 33, 33 with bolts 37. The door striker 35 is engageable with a not-shown latch of the sliding door.

Between the bent face 13 of the body side outer 3 and the reinforcement panel 31 of the body side inner 5, a vertically-long reinforcement 39 is provided along the vehicle's vertical direction. On the vehicle body outer side of the reinforcement 39, a vertically-long joint bracket 41 and a horizontally-long reinforcement bracket 43 are provided at the center in the vehicle's vertical direction. The joint bracket 41 includes three bolt holes 45, 47, and 49 arranged along the vehicle's vertical direction, and the reinforcement bracket 43 includes two bolt holes 51 and 53 arranged along the vehicle's vertical direction. Herein, the two bolt holes 51 and 53 of the reinforcement bracket 43 are arranged corresponding to the upper two bolt holes 45 and 47 of the joint bracket 41. The bolt holes 51 and 53 are arranged also corresponding to the bolt holes 33 and 33 for the door striker formed in the bent face 13 of the body side outer 3. Moreover, the bolt hole 17a at the front end of the sliding door rail attachment 11 formed in the bent face 13 of the body side outer 3 is arranged corresponding to the lowest bolt hole 49 in the joint bracket 41.

Figure 4:
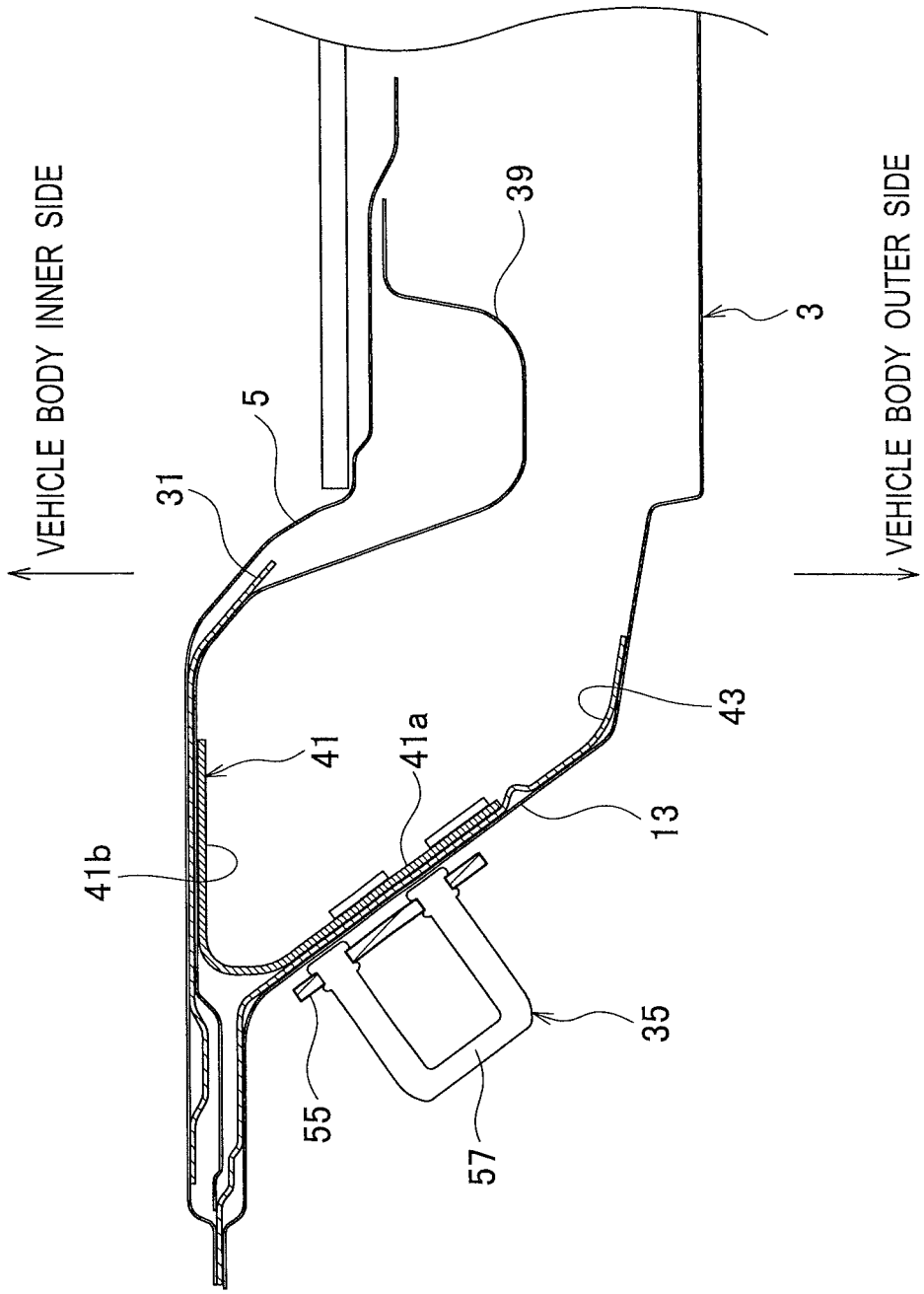
FIG. 4 is a cross-sectional view taken along a line A-A of FIG. 1.

As illustrated in FIG. 4, the reinforcement bracket 43 is joined to (laid on) the vehicle's inner side of the bent face 13 of the body side outer 3, and the joint bracket 41 is joined to the vehicle's inner side of the reinforcement bracket 43. The reinforcement 39 is joined to (laid on) the vehicle body outer side of the body side inner 5.

In FIG. 4, the reinforcement 39 is joined to the body side inner 5 with the reinforcement panel 31 interposed therebetween. However, as apparent from FIG. 2 described above, the upper and lower ends of the reinforcement 39 are directly joined to (laid on) the body side inner 5.

The joint bracket 41 is bent so as to have a V-shaped cross section. An end 41a of the joint bracket 41 is joined to the vehicle body inner side of the reinforcement bracket 43, and an other end 41b is joined to the vehicle body outer side of the reinforcement 39. In such a manner, the joint bracket 41 is attached across the body side outer 3 and body side inner 5. To be specific, the joint bracket 41 is attached across the reinforcement bracket 43 and reinforcement 39.

The door striker 35 includes a plate-shaped base portion 55 and a U-shaped latch engagement portion 57 which is connected to the base portion 55. The joint bracket 41 is connected to the door striker 35 with the bolt 37 (see FIG. 2) with the body side outer 3 as a side panel and reinforcement bracket 43 interposed therebetween.

Figure 5:
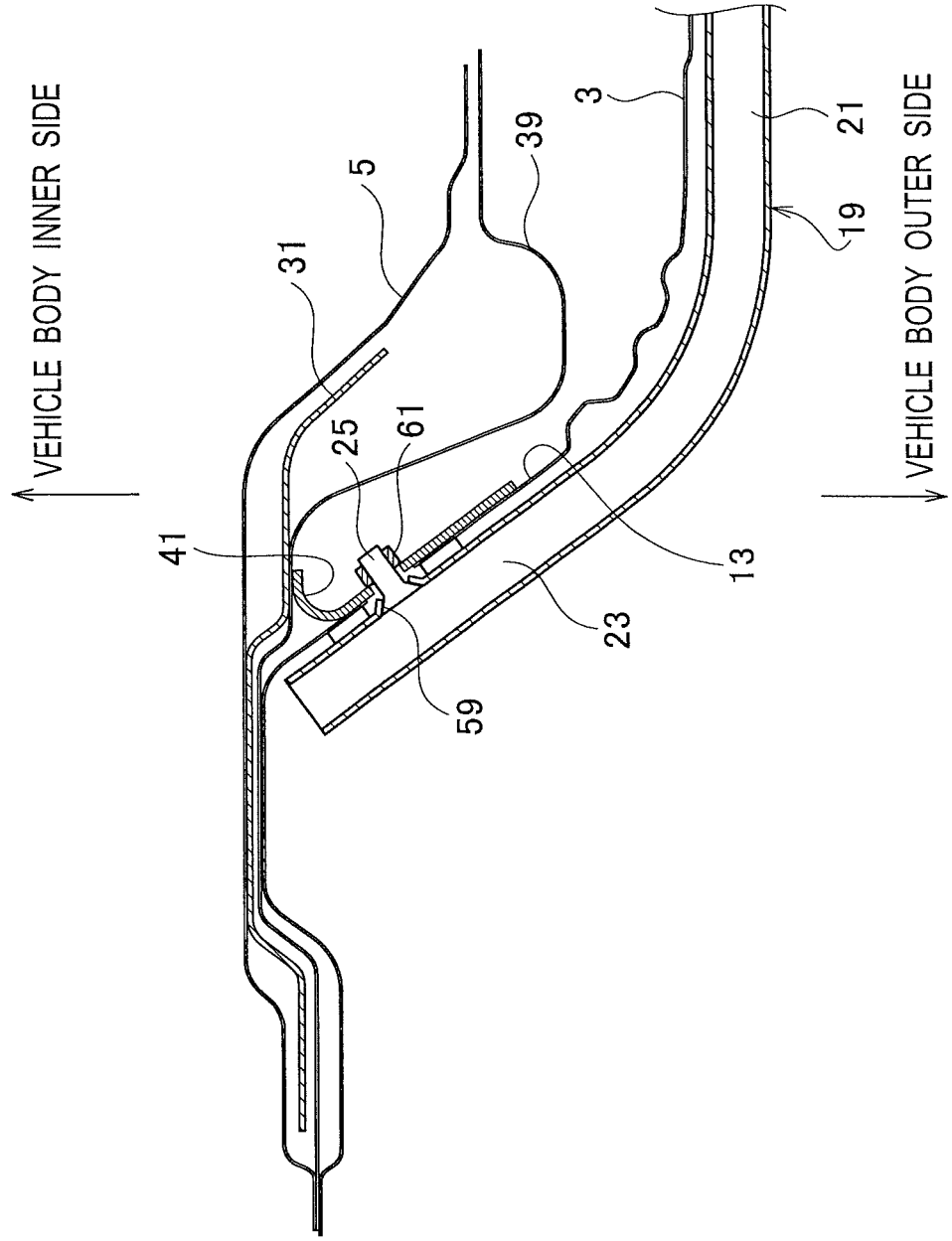
FIG. 5 is a cross-sectional view taken along a line B-B of FIG. 1.

As illustrated in FIG. 5, a bolt hole 59 is formed at the front end of the bent portion 23 of the sliding door rail 19. Bolt holes are also formed at positions corresponding to the bolt hole 59 in the joint bracket 41 and body side outer 3. A nut 61 is joined in the bolt hole of the joint bracket 41. The corresponding bolt 25 is inserted from the bolt hole 59 of the sliding door rail 19 through the bolt holes of the joint bracket 41 and body side outer 3 to be screwed into the nut 61. The bent portion 23 of the sliding door rail 19 is fastened to the joint bracket 41 with the bent face 13 of the body side outer 3 interposed therebetween.

In such a manner, the joint bracket 41 is connected to the door striker 35 and sliding door rail 19 with the body side outer 3 interposed therebetween.

Hereinafter, a description is given of operational effects of the embodiment of the present invention.

(1) The side structure of the vehicle body of the embodiment of the present invention includes: the body side outer 3 (the side panel) provided in the side part of the vehicle body; the door striker 35 which is provided on the vehicle body outer side of the body side outer 3 and is engageable with the latch of the sliding door; the sliding door rail 19 which is provided on the vehicle body outer side of the body side outer 3 and slidably supports the sliding door; and the joint bracket 41 provided on the vehicle body inner side of the body side outer 3. The joint bracket 41 is connected to the door striker 35 and sliding door rail 19.

Specifically, the joint bracket 41 is provided on the vehicle body inner side of the body side outer 3, and the door striker 35 and sliding door rail 19 are opposite to each other across the body side outer 3. The joint bracket 41 is connected to the door striker 35 and sliding door rail 19 with the body side outer 3 interposed therebetween.

Since the joint bracket 41 is connected to the door striker 35 and sliding door rail 19 in such a manner, the mounting strength of the door striker 35 is increased. Accordingly, it is possible to effectively prevent the engaged latch and door striker 35 from being disengaged when a load is applied to the sliding door in the case of a side collision of the vehicle.

To be specific, when a load is transmitted from the latch of the sliding door to the door striker 35, the load is transmitted from the door striker 35 to the sliding door rail 19 via the joint bracket 41. The sliding door rail 19 is attached to the body side outer 3 and has a high mounting strength. The sliding door rail 19 therefore can reliably accept the load. This can increase the mounting strength of the door striker 35, thus preventing the latch and door striker 35 from being disengaged.

(2) The side panel is the body side outer 3 provided on the vehicle body outer side. The body side inner 5 is provided on the vehicle body inner side of the body side outer 3. The joint bracket 41 is attached across the vehicle body inner side of the body side outer 3 and the vehicle body outer side of the body side inner 5.

This increases the support stiffness of the joint bracket 41, thus further increasing the mounting strength of the door striker 35.

(3) The reinforcement bracket 43 is interposed between the joint bracket 41 and the body side outer 3. This can further increase the mounting strength of the door striker 35.

(4) The reinforcement bracket 43 is laid on the vehicle body inner side of the body side outer 3, and the reinforcement 39 is laid on the vehicle body outer side of the body side inner 5. Moreover, the joint bracket 41 is attached across the reinforcement bracket 43 and the reinforcement 39.

Accordingly, when a load is transmitted from the sliding door to the door striker 35 in the case of a side collision of the vehicle, the transmitted load can be distributed to the body side outer 3 and body side inner 5 more reliably. It is therefore possible to effectively prevent the latch and door striker 35 from being disengaged.

The entire contents of Japanese Patent Application No. 2012-003744 (filed on: Jan. 12, 2012) are incorporated herein by reference.

Hereinabove, the contents of the present invention are described with the embodiment, but it is obvious to those skilled in the art that the present invention is not limited to the above description and can be variously changed and modified.

INDUSTRIAL APPLICABILITY

In the side structure of a vehicle body according to the present invention, the joint bracket is connected to both the door striker and the sliding door rail, so that the mounting strength of the door striker is increased. Accordingly, it is possible to effectively prevent the latch and the door striker from being disengaged when a load is applied from the vehicle body inner side to the sliding door.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

3 BODY SIDE OUTER (SIDE PANEL)
5 BODY SIDE INNER
19 SLIDING DOOR RAIL
35 DOOR STRIKER
39 REINFORCEMENT
41 JOINT BRACKET
43 REINFORCEMENT BRACKET

The invention claimed is:

1. A side structure of a vehicle body, comprising:
   a side panel provided in a side part of the vehicle body;
   a door striker which is provided on a vehicle body outer side of the side panel and is engageable with a latch of a sliding door;
   a sliding door rail which is provided on the vehicle body outer side of the side panel and slidably supports the sliding door; and
   a joint bracket provided on a vehicle body inner side of the side panel,
   wherein the joint bracket is fastened together to the door striker with the side panel interposed therebetween and the joint bracket is fastened together to the sliding door rail with the side panel interposed therebetween.

2. The side structure of the vehicle body according to claim 1, wherein
   the side panel is a body side outer provided on the vehicle body outer side,
   a body side inner is provided on the vehicle body inner side of the body side outer; and
   the joint bracket is attached across the vehicle body inner side of the body side outer and the vehicle body outer side of the body side inner.

3. The side structure of the vehicle body according to claim 1, wherein
   a reinforcement bracket is interposed between the joint bracket and the body side outer.

4. The side structure of the vehicle body according to claim 3, wherein
   the reinforcement bracket is laid on the vehicle body inner side of the body side outer, and a reinforcement is laid on the vehicle body outer side of the body side inner, and
   the joint bracket is attached across the reinforcement bracket and the reinforcement.

5. The side structure of the vehicle body according to claim 2, wherein
   a reinforcement bracket is interposed between the joint bracket and the body side outer.

* * * * *